United States Patent Office 3,364,408
Patented Jan. 16, 1968

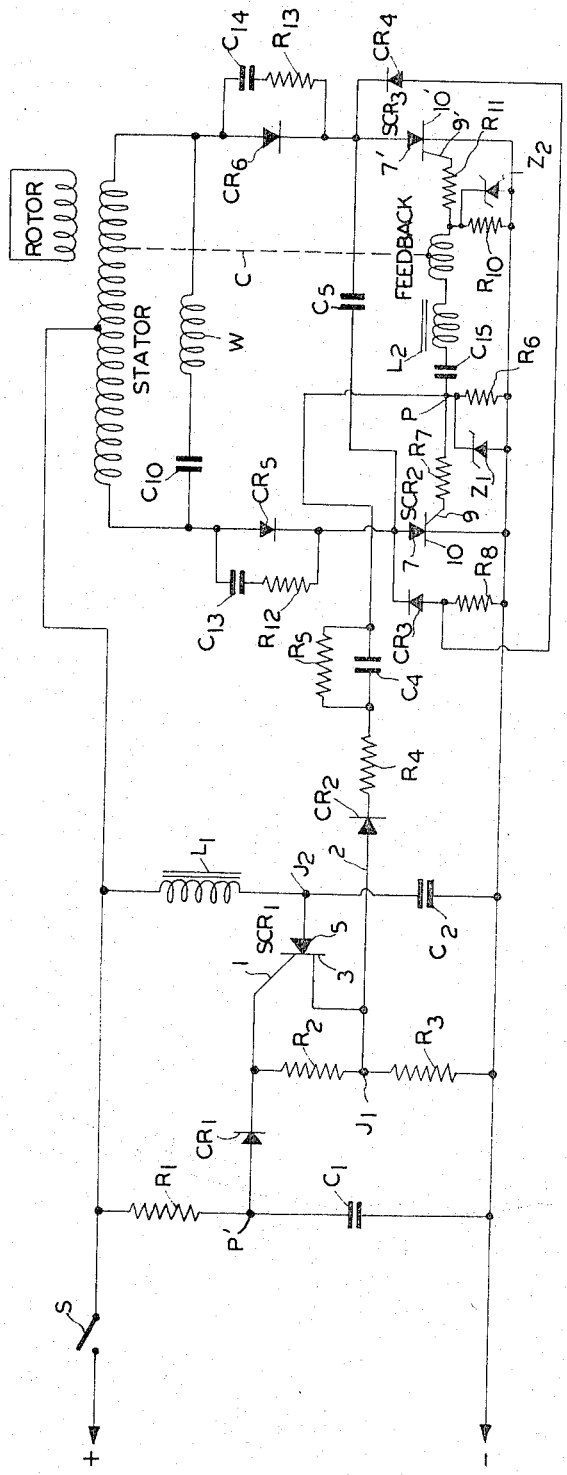

3,364,408
ELECTRIC MOTOR APPARATUS WITH TRIGGER CONTROLLED SWITCHING CIRCUITS FOR ENERGIZING THE STATOR THEREOF
Leonhard Katz, Woburn, Mass., and Karl W. Miles, Wilton, N.H., assignors to Astro Dynamics, Inc., Burlington, Mass., a corporation of Massachusetts
Filed Sept. 7, 1965, Ser. No. 485,320
14 Claims. (Cl. 318—138)

ABSTRACT OF THE DISCLOSURE

This disclosure is concerned with electric motor apparatus in which the stator is energized by triggered switching circuits employing silicon-controlled rectifiers and the like.

---

The present invention relates to electric motor switching apparatus, though applicable in certain aspects, also, to switching circuits in general; one of the preferred applications being more specifically, though not exclusively, concerned with direct-current motors and the like embodying preferably solid-state switching commutating oscillating circuits, such as those described, for example, in United States Letters Patent No. 3,098,958 issued July 23, 1963, to the applicant Leonhard Katz herein.

Particularly when silicon-controlled rectifiers and the like are employed as triggering or switching elements in such oscillator apparatus, certain uncertainties in operation can arise under some circumstances. Such a triggered rectifier, for example, used upon start-up to provide an initial triggering of a pair of push-pull operated switching relays, can respond deleteriously to spurious transients and ripple in the voltage supply. The push-pull switching relays themselves, especially when of the controlled or triggered rectifier type, moreover, can be subject to instability and undesired modes of switching operation. It is to the solution of such problems that the present invention is primarily directed. In summary, the invention provides for an assurance of proper start-up triggering and proper switching frequency of operation in such controlled rectifier circuits.

An object of the invention, accordingly, is to provide a new and improved triggered switching oscillator circuit that shall not be subject to the above-described disadvantages.

A further object is to provide a novel D.C. switching motor employing silicon-controlled rectifiers and the like.

Other and further objects will be explained hereinafter and will be more fully delineated in the appended claims.

The invention will now be described in connection with the accompanying drawing, the single figure of which is a schematic circuit diagram of a preferred embodiment. For purposes of illustration, the inventive features are illustrated in connection with the above-mentioned Katz type of motor, through the application of the novel techniques herein to more general switching circuits will be readily apparent.

Referring to the drawing, the stator winding (labelled STATOR) of such a motor is shown provided with push-pull operating signals from a pair of push-pull connected silicon-controlled rectifiers $SCR_2$ and $SCR_3$ that are alternately triggered as later explained. A rotor or other load (labelled ROTOR) may be controlled by the alternating field thus produced by the switching oscillations of the rectifiers $SCR_2$ and $SCR_3$, sustained by feedback produced by a feedback winding (labelled FEEDBACK), schematically shown coupled to the STATOR by the dotted line C, in a manner described in the said Letters Patent and as hereinafter more fully set forth.

In start-up operations, a trigger device, also shown as a silicon-controlled rectifier or similar trigger relay $SCR_1$, is energized in its input from the voltage supply source $+$, $-$, upon closing start switch S, to produce the initial firing or trigger pulse that is to be applied by output conductor 2 to a common point P of the push-pull-connected input circuit of the pair of switching rectifiers $SCR_2$ and $SCR_3$. As before stated, erratic operation can occur with such circuit elements in false response to transients such as ripple and the like in the supply voltage. To avoid this effect and to insure the desired positive initial firing or triggering, a time-delay circuit, shown in the form of the series-connected resistance-capacitance network $R_1$, $C_1$ is connected across the voltage supply $+$, $-$, with the intermediate point P' thereof connected through a ripple or hash-suppressing diode $CR_1$ to the trigger electrode or gate 1 of the trigger device $SCR_1$. The cathode and anode main electrodes 3 and 5 of the controlled rectifier $SCR_1$ are respectively connected to the intermediate junction $J_1$ of bias-supplying voltages divider resistor network $R_2$-$R_3$ (extending between the trigger electrode 1 and the $-$ voltage supply terminal) and the junction $J_2$ between an inductor or resistor $L_1$ and a ripple filter capacitor $C_2$ (connected between the $+$ and $-$ terminals).

Thus, when start switch S is closed, a time delay is introduced before any voltage can trigger the normally ineffective device $SCR_1$; namely, a predetermined time controlled by the charging of $C_1$ through $R_1$. Only when the charged voltage developed between the gate or trigger electrode 1 and the cathode electrode 3 reaches the threshold trigger voltage, will the device $SCR_1$ be fired into conduction and thus rendered effective, with the resulting positive production of an initiating trigger pulse at 2 for application to the switching rectifiers $SCR_2$ and $SCR_3$. Spurious transients and the like cannot thus start the apparatus off improperly. Once $SCR_1$ triggers and conveys the initiating pulse to point P in the interconnected input circuits of $SCR_2$ and $SCR_3$, it remains conducting.

The application of the initiating trigger pulse by conductor 2 to point P is shown effected through a diode $CR_2$ (that blocks pulses that might otherwise be fed back from the motor feedback circuit to $R_3$ and thus effect the operation of $SCR_1$) connected in series with a resistor $R_4$ and a D.C. isolation capacitor $C_4$. Capacitor $C_4$ may be shunted by a resistor $R_5$ to discharge $C_4$ in order to allow a subsequent restart within a short time, the resistor $R_5$ requiring a sufficiently high resistance to prevent the D.C. voltage at P from maintaining $SCR_3$ in a fired or conducting condition.

The anode main electrodes 7 and 7' of $SCR_2$ and $SCR_3$, respectively, are connected to opposite ends of the stator winding STATOR in push-pull fashion, with the center tap of that winding connected to the $+$ terminal. Starting capacitor $C_{10}$ and winding W are shown shunt-connected across the STATOR, with commutating capacitor $C_5$ connected between anodes 7 and 7'. In order to prevent commutating capacitor $C_5$ from discharging back through the STATOR winding, thus giving a longer than desired back bias on the switching rectifiers being turned off, isolation diodes $CR_5$ and $CR_6$ are preferably, though not always essentially, inserted in the connections between the anodes 7 and 7' and the ends of the STATOR winding. Despiking resistance-capacitance networks $R_{12}$-$C_{13}$ and $R_{13}$-$C_{14}$ may be connected across respective diodes $CR_5$ and $CR_6$ to prevent excess voltage from appearing across the diodes.

The initial trigger pulse application point P is shown connected through current limiting resistor $R_7$ to the gate or trigger electrode 9 of $SCR_2$, the cathode 10 being returned to the $-$ supply terminal. The point P is also shown connected (through interposed tuned circuit $C_{15}$-$L_2$ and the winding FEEDBACK) through current limiting resistor $R_{11}$ to the gate or trigger electrode 9' of $SCR_3$, with the cathode 10' connected to the — terminal. The point P and the left-hand end of resistance $R_{11}$ are respectively connected to the — terminal through return resistors $R_6$ and $R_{10}$, preferably shunted by Zener or other diodes $Z_1$ and $Z_2$ that not only remove the negative half of the voltage of the feedback circuit from the gates 7 and 7', but also provide a return path from the feedback supply when they conduct. If Zeners are used, they may also limit the voltage applied to the gates 7 and 7'.

The before-mentioned positive control of the switching frequency of $SCR_2$ and $SCR_3$, and thus the frequency of the operating signals applied to the STATOR and the resulting speed of the motor, has been found attainable through the controlling action of the tuned network circuit $C_{15}$–$L_2$ interposed in the push-pull-connected input circuits of $SCR_2$ and $SCR_3$. This series-connected tuned network exerts a strong control of the phase or time relation between the firing from the feedback voltage, thus controlling the frequency of the oscillating circuit and the speed of the motor. Variation of either $C_{15}$ or $L_2$ (or of a series resistor, not shown) provides a positive and facile speed control.

Diodes $CR_3$ and $CR_4$, in series with resistor $R_8$, and connected between the main anode-cathode electrodes 7-10 and 7'-10', prevent the voltage across either half of the motor winding from exceeding the supply voltage and also compensate for leading or lagging power factors during the motor speed-up. They also permit smaller capacity and voltage commutating capacitance $C_5$.

As an illustration of the efficacy of the invention, highly stable triggering and speed variation control has been produced with a firing or trigger $SCR_1$ of Type 2N1774, switching rectifiers $SCR_2$ and $SCR_3$ of Type 2N1777, a time delay (produced by $R_1$–$C_1$) of the order of about one-tenth a second, and with adjustment of $C_{15}$–$L_2$ to produce variable speeds corresponding to predetermined oscillator frequencies of from 200 to 500 cycles.

Further modifications will occur to those skilled in the art, and all such are considered to fall within the spirit and scope of the invention as set forth in the following claims.

What is claimed is:

1. Electric motor apparatus having, in combination, a rotor and a stator, a pair of trigger switching means each having input and output circuits and adapted to be alternately triggered in their input circuits to apply push-pull operating signals to said stator in their output circuits, a normally ineffective trigger device connected with said input circuits for starting the operation of the said switching means when rendered effective, said device having an input and an output the latter of which is connected to the said switching means to initiate operation of the same upon the rendering effective of the trigger device, means for supplying voltage including a start switch, time-delay means connected between the voltage supplying means and the said input of the trigger device and responsive upon the operation of the said start switch for delaying the transfer of voltage from the supply means to the trigger device a predetermined time after the operation of the said start switch in order to prevent false triggering of the trigger device in response to transient and other spurious effects in the voltage from the voltage-supplying means, feedback winding means coupled with the said stator and connected in push-pull with the said input circuits, and tuned circuit means interposed in the connections of said feedback winding means with the said input circuits and adjustable to a predetermined frequency to determine the frequency of the alternating triggering of the said pair of switching means in accordance with said predetermined frequency.

2. Electric motor apparatus having, in combination, a rotor and a stator, a pair of switching means adapted to be operated alternately for applying operating signals to said stator, a normally ineffective trigger device for starting the operation of the switching means when rendered effective, said device having an input and an output the latter of which is connected to the switching means to initiate operation of the same upon the rendering effective of the trigger device, means for supplying voltage including a start switch, and time-delay means connected between the voltage supplying means and the said input of the trigger device and responsive upon the operation of the said start switch for delaying the transfer of voltage from the supply means to the trigger device a predetermined time after the operation of the said start switch in order to prevent false triggering of the trigger device in response to transient and other spurious effects in the voltage from the voltage-supplying means, said trigger device comprising controlled rectifier means and the said time-delay means comprising a resistance-capacitance network, the said controlled rectifier means being provided with a pair of main electrodes and a trigger electrode, the said network being connected across the voltage supplying means and from an intermediate point of the network through diode means to the said trigger electrode, voltage divider means connected between one of the main electrodes and the trigger electrode, and means for connecting the other main electrode with the said voltage supplying means, the said output being connected from the said one main electrode.

3. Apparatus as claimed in claim 2 and in which the said output comprises further rectifier means connected in circuit with capacitive means.

4. Apparatus as claimed in claim 3 and in which the said pair of switching means is provided with a corresponding pair of interconnected input circuits, and means for connecting the said output to a common point of the input circuits.

5. Electric motor apparatus having, in combination, a rotor and a stator, a pair of switching means adapted to be operated alternately for applying operating signals to said stator, a normally ineffective trigger device for starting the operation of the switching means when rendered effective, said device having an input and an output the latter of which is connected to the switching means to initiate operation of the same upon the rendering effective of the trigger device, means for supplying voltage including a start switch, and time-delay means connected between the voltage supplying means and the said input of the trigger device and responsive upon the operation of the said start switch for delaying the transfer of voltage from the supply means to the trigger device a predetermined time after the operation of the said start switch in order to prevent false triggering of the trigger device in response to transient and other spurious effects in the voltage from the voltage-supplying means, the said pair of switching means being a pair of push-pull-connected controlled rectifiers provided with two main electrodes and a trigger electrode, one of the main electrodes of each of the push-pull-connected rectifiers being connected to one end of the stator, and the said output applying trigger voltage through resistance between the trigger and other main electrode of each of the push-pull-connected rectifiers, additional diode and resistance being connected between the main electrodes of each of the push-pull-connected rectifiers.

6. Electric motor apparatus having, in combination, a rotor and a stator, a pair of switching means adapted to be operated alternately for applying operating signals to said stator, a normally ineffective trigger device for starting the operation of the switching means when rendered effective, said device having an input and an output the latter of which is connected to the switching means to initiate operation of the same upon the rendering effective of the trigger device, means for supplying voltage including a start switch, and time-delay means connected between the voltage supplying means and the said input of the trigger device and responsive upon the operation of the said start switch for delaying the transfer of voltage from the supply means to the trigger device a predetermined time after the operation of the said start switch in order to prevent false triggering of the trigger device in response to transient and other spurious effects in the voltage from the voltage-supplying means, the said pair of switching means being a pair of push-pull-connected controlled rectifiers provided with two main electrodes and a trigger electrode, one of the main electrodes of each of the push-pull-connected rectifiers being connected to one end of the stator, and the said output applying trigger voltage through resistance betwen the trigger and other main electrode of each of the push-pull-connected rectifiers, the input circuit push-pull connections between the trigger and the said other main electrode of the pair of push-pull connected rectifiers being provided with a common terminal connected to the said trigger device output, commutating capacitance being connected between the said one main electrodes of the pair of push-pull-connected rectifiers.

7. Apparatus as claimed in claim 6 and in which isolating diode means are connected between the said one main electrodes and the stator.

8. Apparatus as claimed in claim 6 and in which the input circuit push-pull connections include a pair of resistors connected between the trigger and the said other main electrode of each of the pair of push-pull-connected rectifiers.

9. Apparatus as claimed in claim 8 and in which further diode means is connected with one resistor of each of the said pair of resistors.

10. Apparatus as claimed in claim 8 and in which a tuned circuit is interposed in the said input push-pull connections.

11. Apparatus as claimed in claim 10 and in which said tuned circuit comprises a series-connected capacitance and inductance network.

12. Apparatus as claimed in claim 8 and in which a feedback winding coupled to the stator is interposed in the said input push-pull connection.

13. Electric motor apparatus having, in combination, a rotor and a stator, a pair of trigger switching means each having input and output circuits and adapted to be alternately triggered in their input circuits to apply push-pull operating signals to said stator in their output circuits, a normally ineffective trigger device connected with said input circuits to initiate operation of the same when rendered effective, feedback winding means coupled with the said stator and connected in push-pull with the said input circuits, and tuned circuit means interposed in the connections of said feedback winding means with the said input circuits and adjustable to a predetermined frequency to determine the frequency of the alternating triggering of the said pair of trigger-switching means in accordance with said predetermined frequency, the said pair of switching means being a pair of push-pull connected controlled rectifiers provided with two main electrodes and a trigger electrode, one of the main electrodes of each of the push-pull-connected rectifiers being connected between the trigger and other main electrode of each of the push-pull connected rectifiers, additional diode and resistance being connected betwen the main electrodes of each of the push-pull-connected rectifiers.

14. Electric motor apparatus having, in combination, a rotor and a stator, a pair of trigger switching means each having input and output circuits and adapted to be alternately triggered in their input circuits to apply push-pull operating signals to said stator in their output circuits, a normally ineffective trigger device connected with said input circuits to initiate operation of the same when rendered effective, feedback winding means coupled with the said stator and connected in push-pull with the said input circuits, and tuned circuit means interposed in the connections of said feedback winding means with the said input circuits and adjustable to a predetermined frequency to determine the frequency of the alternating triggering of the said pair of trigger-switching means in accordance with said predetermined frequency, the said pair of switching means being a pair of push-pull connected controlled rectifiers provided with two main electrodes and a trigger electrode, one of the main electrodes of each of the push-pull-connected rectifiers being connected betwen the trigger and other main electrode of each of the push-pull connected rectifiers, further diode means being connected with one resistor of each of the said pair of resistors.

References Cited

UNITED STATES PATENTS

| | | | |
|---|---|---|---|
| 2,814,008 | 11/1957 | Staniloff | 318—254 |
| 2,995,690 | 8/1961 | Lemon | 318—171 |
| 3,025,443 | 3/1962 | Wilkinson et al. | 318—138 |
| 3,083,326 | 3/1963 | Deming et al. | 318—138 |
| 3,161,834 | 12/1964 | Hoyes | 331—62 |
| 3,290,573 | 12/1966 | Kemens | 318—171 |

ORIS L. RADER, *Primary Examiner.*

G. RUBINSON, *Assistant Examiner.*